Sept. 6, 1938.  C. BUFFEHR  2,129,116

ICE CUBING MACHINE

Filed April 13, 1937  4 Sheets-Sheet 1

Inventor
Charles Buffehr
By Watson E. Coleman
Attorney

Sept. 6, 1938.　　　　　C. BUFFEHR　　　　　2,129,116
ICE CUBING MACHINE
Filed April 13, 1937　　　　4 Sheets-Sheet 3
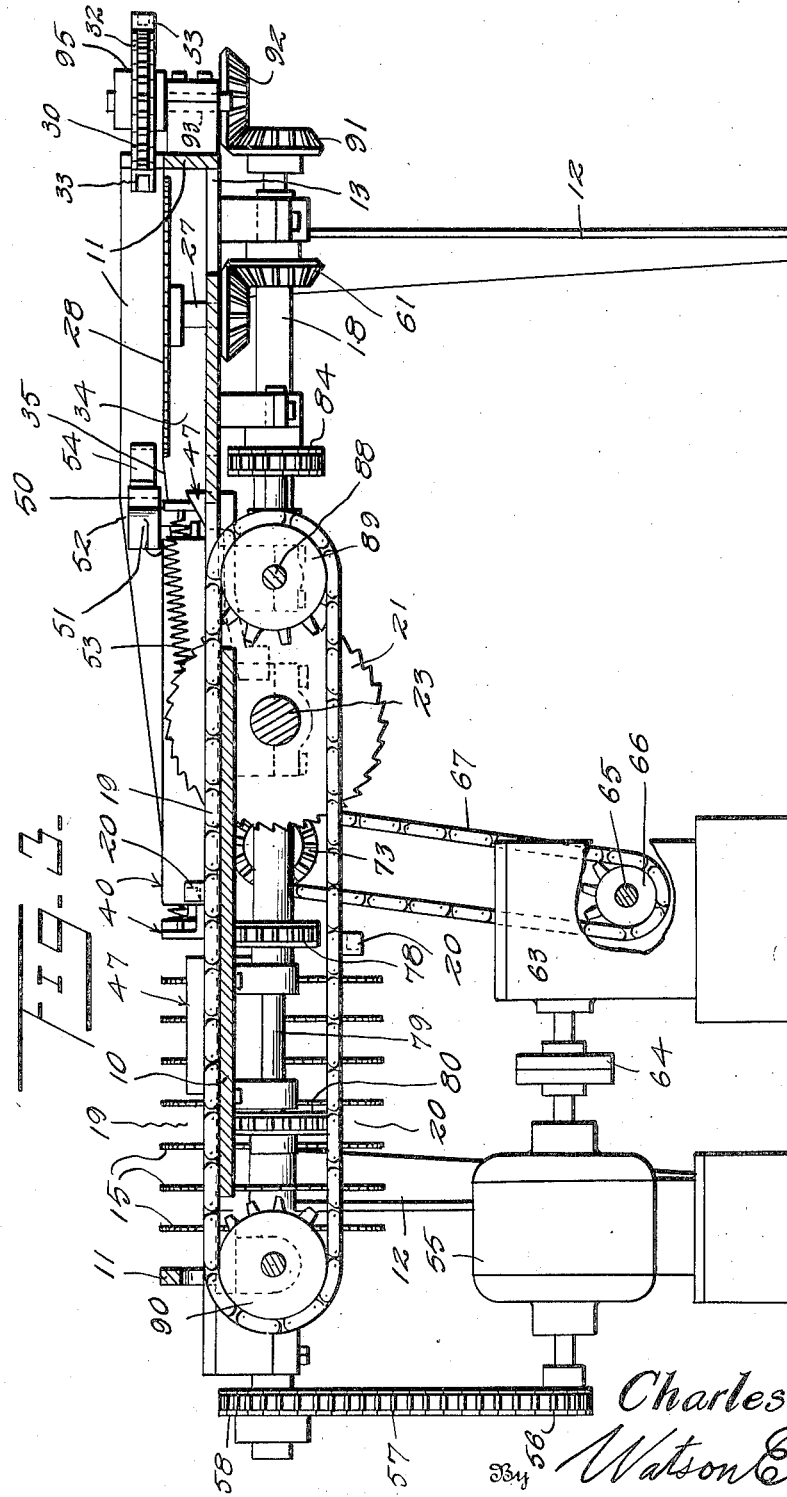
Inventor
Charles Buffehr
By Watson E. Coleman
Attorney Sept. 6, 1938.     C. BUFFEHR     2,129,116
ICE CUBING MACHINE
Filed April 13, 1937     4 Sheets-Sheet 4
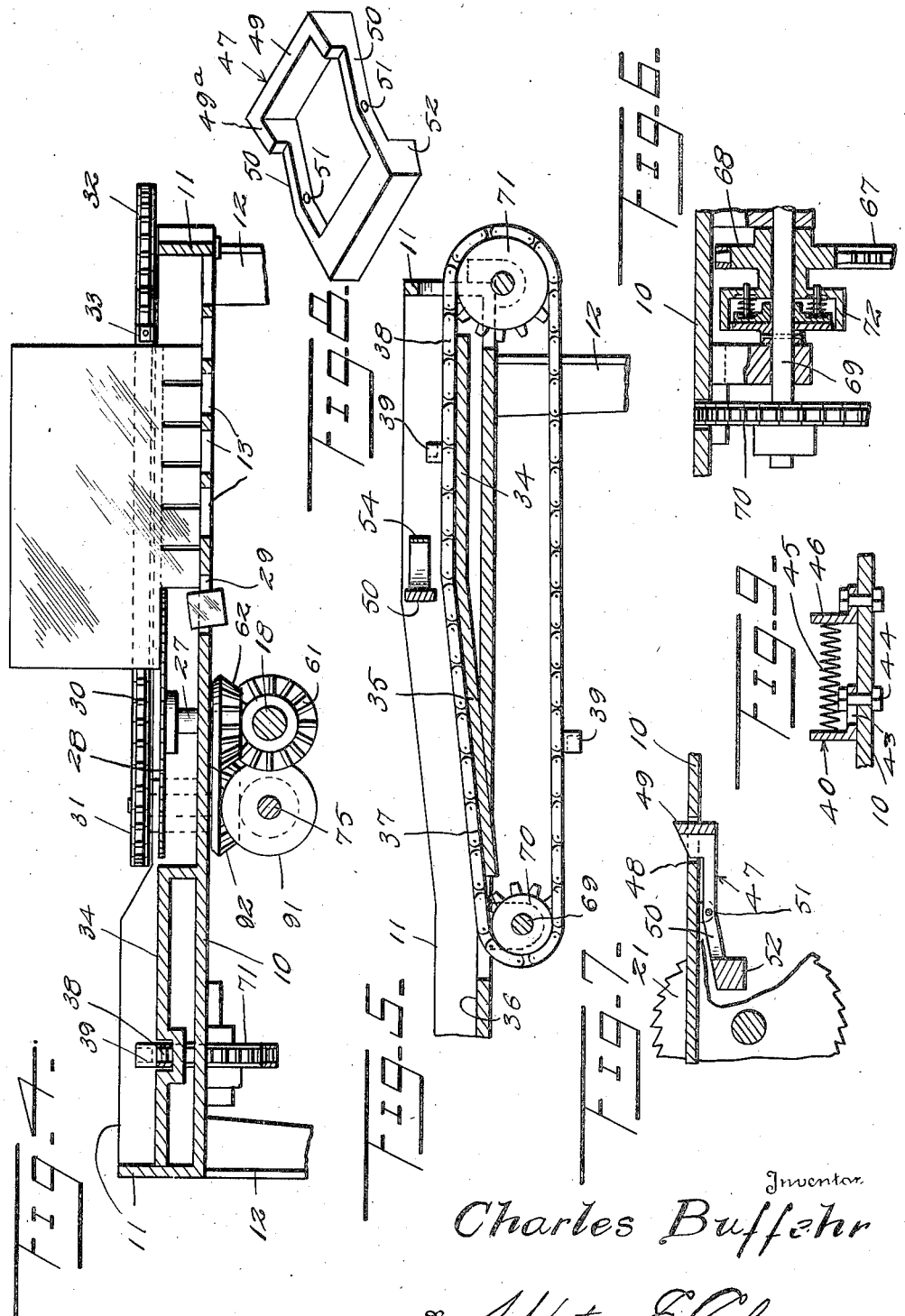
Inventor
Charles Buffehr
By Watson E. Coleman
Attorney Patented Sept. 6, 1938

2,129,116

UNITED STATES PATENT OFFICE 2,129,116

ICE CUBING MACHINE

Charles Buffehr, Cheyenne, Wyo.

Application April 13, 1937, Serial No. 136,675

7 Claims. (Cl. 143—38)

This invention relates to devices for cutting ice in small cubes and the general object is to provide a construction of this character wherein a block of ice may be cut up into small cubes, particularly wherein these cubes are cut from the underface of the block of ice, and means are provided for carrying this block past the several gangs of cutting saws until the block is entirely used up.

Another object is to provide a device of this character having two gangs of rotary saws which cut the bottom of the block into rectangles and provide a horizontal saw against which the block is carried, this horizontal saw cutting off the rectangular pieces of ice defined by the channels cut by the first named saws so as to form cubes.

A further object is to provide means whereby when the cubes have been cut from the bottom of the block, the block may then be carried by a conveyor again past the two gangs of saws and back to the horizontal saw, thus causing the block to pass around and around the cutting table until it is entirely used up.

Other objects have to do with the details of construction and arrangement of parts as will appear more fully hereinafter.

My invention is illustrated in the accompanying drawings wherein:

Figure 3 is a section on the line 3—3 of Figure 1.

Figure 4 is a section on the line 4—4 of Figure 1.

Figure 5 is a fragmentary longitudinal section on the line 5—5 of Figure 1.

Figure 6 is a section on the line 6—6 of Figure 2.

Figure 7 is a detailed fragmentary section on the line 7—7 of Figure 1.

Figure 8 is a perspective view of the guide shown in Figure 7.

Figure 9 is a fragmentary sectional view through one of the pivoted guides and a portion of the table.

Figure 1:
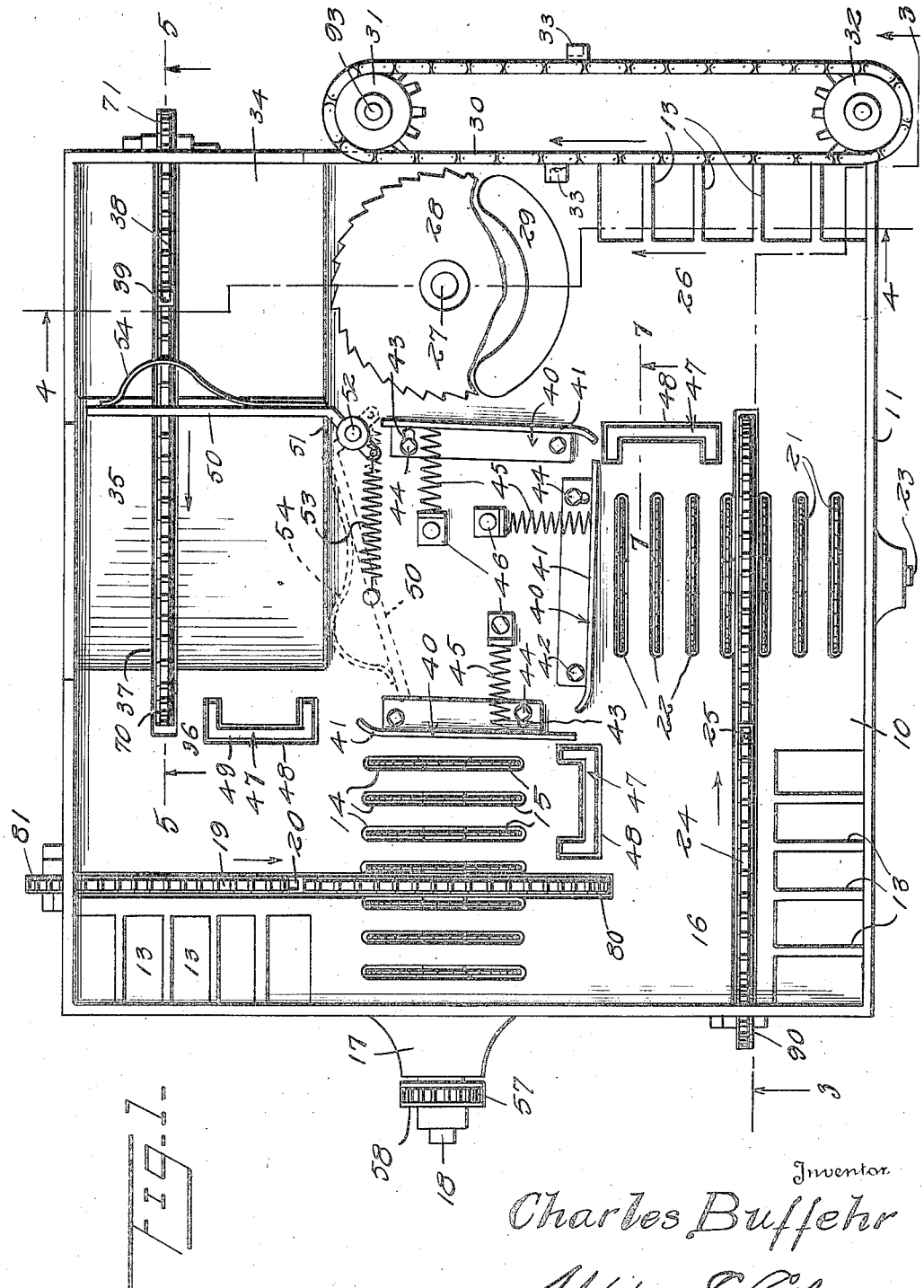
Figure 1 is a top plan view of an ice cube cutting table constructed in accordance with my invention.

Referring to these drawings, 10 designates a table approximately square in plan having the upwardly extending marginal wall 11, the supporting legs 12 and openings 13 adjacent certain corners of the table. Disposed through slits 14 extending parallel to one side edge of the table are a plurality of circular saws 15 shown as seven in number, discharging upon a portion 16 of the table. The saws are mounted upon an arbor 18 carried by bearings 17. Coacting with these saws and extending between two of the saws and in their plane of rotation is an endless conveyor 19 having projecting therefrom two lugs 20. The manner in which the saws and conveyor are driven will be later described.

Disposed in vertical planes at right angles to the planes of the saws 15 and parallel to a second margin of the table are a plurality of rotary saws 21 extending through slots 22 in the table and mounted upon an arbor 23. Coacting with these saws is an endless conveyor 24 which operates, like the endless conveyor 19, through a slot in the table, this endless conveyor having the lugs 25. The lugs 20 and 25 are adapted to engage a block of ice, carry the block parallel to the saws 15, then carry the block parallel to the saws 21 and discharge the block upon a flat portion 26 of the table.

Extending through one end of this flat portion of the table is an arbor 27 carrying upon it a horizontal circular saw 28. Just below that margin of the saw which confronts the flat portion 26 of the table is an opening 29, for a purpose to be later stated. Associated with the saw 28 is an endless conveyor 30 traveling in a horizontal plane over the sprocket wheels 31 and 32, this conveyor, as illustrated, being made up of links and carrying the two lugs 33. The conveyor moves in the direction of the arrow in Figure 1 and the lugs 33 carry a block of ice, the underface of which has been cut by the saws 15 and 21 into contact with the saw 28. The saw 28 is disposed at a height above the flat portion 26 of the table 10 equal to the cutting of the saws 15 and 21. The saws 15 and 21 will form kerfs or cuts in the bottom of a block of ice at right angles to each other and then as the block of ice is engaged by the saw 28, the bottom of this block will be cut off and the cubes so formed will drop through the aperture 29.

The block is carried over the upper surface of the saw 28 by means of the lug on the endless carrier 30 and the block is carried onto a raised portion 34 of the table, the upper face of this raised portion being in the same plane as the upper face of the saw 28. From the raised portion 34 extends the downwardly inclined surface 35 which lowers the block of ice to the plane of the portion 36 of the table where the block is again engaged by the conveyor 19. The surface of the portion 34 and 35 and the flat portion 36 has a longitudinal slot 37 through which operates the conveyor 38 provided with the lugs 39. This conveyor moves in the direction of the arrow, Figure 1, and carries the block from the raised portion 34 downward over the inclined portion 35 and discharges it onto the portion 36 of the table where the block is again engaged by a lug 20 of the conveyor 19 and carried again through the saws 15, thence by conveyor 24 past the saws 21 and then again by conveyor 30 over the upper face of the saw 28 and so back to the portion 34. It will thus be seen that the block moves in a closed path past the several sets of saws until the block has been entirely cut up into cubes.

For the purpose of guiding the block in its movement past the saws 15, I provide a guide 40 which has an upwardly extending flange 41. This guide is pivoted upon a pin 42 extending down into the table and the other end of the guide is slotted at 43 and a pin 44 passes through this slot. A spring 45 at one end bears against an abutment 46 on the table and at the other end bears against the flange 41 and urges this guide 40 toward the saws 15. As the block passes between this guide 41 and the parallel flange 11, it is guided so as to move in a path exactly parallel to the plane of rotation of the saws 15. The block is also guided in this direction after it passes onto the portion 36 of the table by means of a guide 47. This guide is of a character shown in Figure 7, and operates through a slot 48 in the table. The guide has an upstanding end wall 49 which is carried by two arms 50 pivoted at 51 to the table and weighted at its end opposite the wall 49, this weight being designated 52. The walls 49 have angular extensions 49ᵃ which are inclined upward and toward the wall 49 and thus, as will be seen from Figure 1, when the block of ice is engaged by the lug 39 of conveyor 38 and moves down off the inclined face 35 onto the face 36 of the table, the block will force the wall 49 downward, and then when the block has passed this guide, the wall 49 will rise and act as a guide for the block of ice as it is carried from the face 36 into engagement with the saws 15. Associated with the gang of saws 21 is a second guide designated 40 and constructed in exactly the same manner as the guide 40 associated with the saws 15 and urged outward by a spring 45. Disposed in advance of the saws 15 is a pivoted guide designated generally 47 which is of the same character as the guide heretofore referred to but which has its wall 49 extending parallel to the planes of the saws 21. As the block of ice passes through the saws 15, it is carried onto the conveyor 24 by the conveyor 19 and is carried by this conveyor into position between the marginal flange 11 of the table and the guide 40 and is thus carried through the saws 21 and discharged upon the portion 26 of the table.

Associated with the horizontal saw 26 is a guide 40 of exactly the same character as heretofore described, except that the end wall 41 is higher so as to extend above the horizontal saw 28. Also associated with the saw 28 and disposed in advance of the guide 40 thereof is a depressible guide 47 of the same character as the guides 47 heretofore described. As the block of ice passes through the saws 21, it depresses this guide 47 and when the block of ice is engaged by the lug on the conveyor 30 and the block of ice is moved toward the horizontal saw 28, the block will be held by the guide 47 into contact with the lug 33 until the block has passed into the space between the guide 40 and the endless conveyor 39.

Associated with the raised portion 34 of the table and disposed between this raised portion and the inclined portion 35 is a guide 50 in the form of a bar having an angular arm 51 pivoted at 52 for swinging movement in a horizontal plane. A spring 53 urges the guide 50 into a position at right angles to the path of movement of conveyor 38. The face of this guide 50 carries an outwardly bowed or curved rigid member 54. When the ice block is pushed by the lug on conveyor 30 over the saw 28 and after the ice has passed guide 40, the block has a tendency to turn, due to the fact that the push of lug 33 is on a corner of the block. The curved portion 54 of the guide assists in guiding the block squarely onto the corner of the table. By providing this curved portion 54, the point of contact of the ice with guide 50 is kept in the center of the runway even after guide 50 has left the position shown by the full lines. As the ice passes down the inclined portion of the table, the guide 50 turns on its pivot beyond the dotted line position in Figure 1, so that the block can pass by and onto the portion 36 of the table.

The chains which constitute conveyors 19, 24 and 38 operate in recesses or channels formed in the bottom of the table, while the lugs 33 of the conveyor 30 travel over the upper edge of the adjacent flange 11 of the table.

Figure 2:
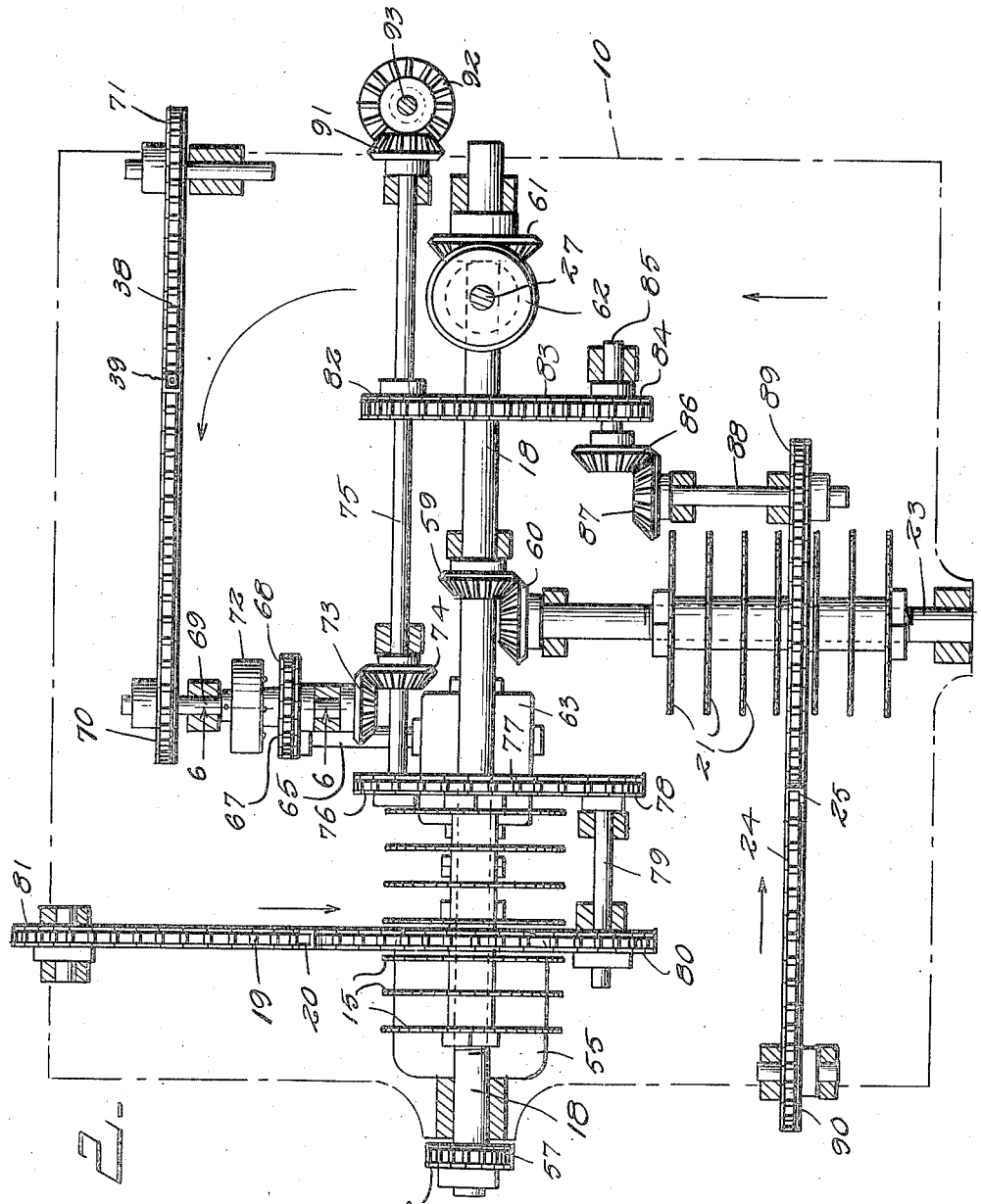
Figure 2 is a top plan view of the endless conveyors and the driving means for the conveyors and the saws, the top of the table being removed.

For the purpose of driving the several conveyors and the saws, I provide a motor shown as an electric motor, and designated 55. The shaft of this motor carries a sprocket pinion 56 over which passes a sprocket chain 57 which engages with a sprocket wheel 58 mounted upon the arbor or shaft 18, which carries the saws 15. Mounted upon this arbor or shaft, as shown in Figure 2, is a beveled gear wheel 59 meshing with a beveled gear wheel 60 upon the arbor or shaft 23 which carries the saws 21. Also mounted upon this shaft 18 is a beveled gear wheel 61 which meshes with a beveled gear wheel 62 which is fast upon the vertical arbor 27 and drives the saw 28. Thus it will be seen that both gangs of saws 15 and 21 and the horizontal saw 28 are all driven at any desired speed.

The shaft of the motor 55 extends into a casing 63 which contains a reducing gear. Inasmuch as these reducing gear units are common in large varieties of machinery and forms no part of my invention, I have not illustrated the reducing gear specifically. Disposed between the reducing gear and the motor 55 is a flexible coupling 64. Extending out of the box 63 is a shaft 65 carrying upon it the sprocket wheel 66 which operates a sprocket chain 67 which engages with a sprocket wheel 68 mounted upon a shaft 69 which in turn carries a sprocket wheel 70 over which the conveyor chain 38 passes. The forward end of this chain passes over an idle sprocket wheel 71 preferably mounted in bearings that may be adjusted to take up wear in the chain.

The shaft 69 is driven from the sprocket wheel 68 through a friction clutch 72 which permits slippage in case a piece of ice gets caught in the machine. The shaft 69 also carries upon it the beveled pinion 73 which engages with a beveled pinion 74 mounted upon a shaft 75, this shaft extending longitudinally of the machine. One end of this shaft carries upon it a sprocket wheel 76 over which a sprocket chain 77 passes to a sprocket wheel 78 on the shaft 79, this shaft carrying the sprocket wheel 80 over which the chain 19 passes, the outer end of the chain passing over an idle sprocket wheel 81.

The shaft 75 also carries upon it the sprocket wheel 82 which, through the sprocket chain 83, drives the sprocket wheel 84 on the shaft 85. This shaft carries upon it the beveled pinion 86 which engages a beveled pinion 87 on a shaft 88. This shaft carries the sprocket wheel 89 which engages with the endless conveyor 24. The outer end of this endless conveyor 24 is trained over an idle sprocket wheel 90. Mounted upon the end of the shaft 75 is a beveled pinion 91 which engages with a beveled pinion 92 mounted upon a shaft 93 which carries the sprocket wheel 31 over which the endless conveyor 30 passes, the outer end of this endless conveyor passing over an idle sprocket wheel 32. Thus all four conveyor chains 19, 24, 30 and 33 are driven at the same speed. These chains are of equal length and each chain is preferably provided with two lugs equi-distantly spaced, which lugs engage the blocks of ice and carry them over the face of the table in a closed rectangular path. Preferably all of the idle sprocket wheels are mounted for adjustment so as to take up wear or slack in the various sprocket chains. As before stated, the clutch 72 is for the purpose of permitting slippage of the chains in case a piece of ice gets caught in the machine.

In the operation of this mechanism, a block of ice is initially placed on that portion of the table designated 36. The lug on the conveyor chain 19 carries the ice over the saws 15, these saws cutting a plurality of kerfs longitudinally on the underface of the ice. As the forward end of the block of ice reaches the guide 47, it depresses this guide and the block of ice moves forward until the end of the block strikes against the rim 11 of the table. At this time, it is engaged by the lug on the chain 24 and is carried in a direction at right angles to its first named direction past the saws 21. These saws cut kerfs in the underface of the block of ice at right angles to the kerfs cut by the saws 15. During the movement of the block under the action of the conveyor 19 and the second movement under the action of the conveyor 24, the block is held firmly against the side flange 11 of the table by means of the pivoted guides 40. As the block passes the saws 21, the forward edge of the block depresses the pivoted guide 47 and the block passes onto the portion of the table designated 26 and into engagement with the lug on the chain 30. As soon as the rear end of the block of ice has passed beyond the guide 47 associated with the saws 21, this guide will rise and the block of ice will then be engaged by the lug on the chain 30 and carried toward and over the horizontal saw 28. The forward edge of this saw will cut off the cube of ice from the bottom of the block and these cubes will drop through the aperture 29. As the cubes are cut off, the block will slide over the upper face of the saw 28 and onto the portion 34 of the table and will be carried into engagement with a lug 39 on the chain 33. The block will then be carried off the raised portion 34 onto the inclined portion 35 of the table and down this inclined portion. As it moves onto the inclined portion 35, it will swing the guide 50 into the dotted line position in Figure 1, and the block will be carried down the incline 35 to the portion 36 of the table over the depressible guide 47 and into position against the rim of the table where it will be engaged by the lug on the chain 19 and again carried through the saws 15 and again around in this endless path until the block of ice has been entirely cut up. The openings 13 are for the purpose of permitting small pieces of ice which may have accidently broken off from the ice block to drop down through the table so as not to block the free movement of the ice. Inasmuch as each of the conveyors has two lugs, it is possible to have four blocks of ice in the machine at one time. The vertical saws 15 and 21 project above the surface of the table a distance equal to the size of the cubes to be cut. In actual practice, this is about 1½″. The horizontal saw 28 is set, under these circumstances, 1½″ above the face of the portion 26 of the table. Thus cubes will be cut having a depth of 1½″. Of course, this is purely illustrative as the saws 15 and 21 may have any desired depth of cut in the block of ice and the horizontal saw 28 will be set at an equal distance above the face of the table so as to cut off the cubes defined by the previous saw cuts. As the block of ice passes from the portion 34 onto the portion 35 of the table, it bears against the curved part of the member 54 of the guide 50, causing the guide 50 to rotate on its pivot and in this rotated position the guide 50 forms the inside guard or guide for the block of ice as it passes down the incline 35 and onto the portion 36 of the table.

While I have not shown this, yet it is to be understood that all chains and sprockets which are exposed beyond the edge of the table should be covered for safety's sake and preferably a guard such, for instance, as a heavy wire screen, is fastened to the table rim 11 and extends a foot or so above the table but with an opening for placing the blocks of ice on the table at 36. I have not shown these protecting shields or covers for the sprocket wheels nor this wire guide as these are obvious features and do not involve any invention.

Inasmuch as this machine is entirely automatic, it is safer to use than the ordinary machines for cubing ice. It is particularly efficient because four blocks of ice may be cut at one time though it is obvious that the machine will operate on one block until that block is used up. As long as blocks of ice are fed one at a time onto the portion 36 of the table, so long will the machine operate to cut these blocks into cubes. The reducing gear contained within the reducing gear box 63 is designed to reduce the speed of the motor to a speed suitable for the conveyor chains. This, under ordinary circumstances, will be approximately 25 ft. per minute. All four of the conveyor chains 19, 24, 30 and 33 are of the same length and run at the same speed and the lugs on each chain are spaced at equal distances from each other.

It will be seen that the guides 40 and the guides 47 define, with the four flanges 11 at the four sides of the table, four runways leading from the portion 36 of the table past the saws 15, then at right angles past the saws 21, then again at right angles along the portion 26 and then again at right angles over the portions 34 and 35 back to the portion 36 of the table, thus defining a cyclic path along which the block of ice travels until it is exhausted. It will also be noted that by having the gang saws 15 and 21 project upward through the table, the block of ice rests upon the table at all times as it travels past the several saws and thus feeds itself automatically to the saws.

While I have illustrated certain details of construction and arrangement of parts which have been found particularly effective in actual practice, I do not wish to be limited thereto as obviously these may be varied in many ways without departing from the spirit of the invention as defined in the appended claims.

What is claimed is:—

1. An ice cubing machine, including a rectangular table having a wall extending along each side edge, a gang of circular saws disposed below the table and parallel with one edge thereof, a second gang of circular saws disposed at right angles to the first named gang and parallel to a second side of the table, the table having slots through which the saws project, an endless conveyor associated with each gang of saws and having one flight traversing the table, each conveyor having outwardly projecting lugs, spring projected guides extending approximately parallel with the marginal wall on the two sides of the table and defining two runways at right angles to each other, a horizontal circular saw disposed in association with a third side of the table and disposed above the table at a height equal to the depth of cut of the gang saws, there being an opening in the table below the forward portion of the horizontal saw adapted to receive the cubes cut from the bottom face of the block, an endless conveyor having lugs and having a flight extending parallel to the wall of the third side of the table on the inner face of the wall, a spring projected guide extending approximately parallel with the last named side of the table and with the wall thereof defining a runway, that portion of the table upon which the block is discharged after passing the horizontal saw being elevated to a level with the saw and the table having an inclined face leading downward parallel to the fourth side of the table and to the entrance end of the first named runway, an endless conveyor having its upper flight traversing the elevated and inclined portions of the table, and guiding means on the table adapted to be disposed in parallel relation to the flange on the fourth side of the table to define a runway leading to the first named conveyor.

2. An ice cubing machine, including a rectangular table having a wall extending along each side edge, a gang of circular saws disposed below the table and parallel with one edge thereof, a second gang of circular saws disposed at right angles to the first named gang and parallel to a second side of the table, the table having slots through which the saws project, an endless conveyor associated with each gang of saws and having one flight traversing the table, each conveyor having outwardly projecting lugs, spring projected guides extending approximately parallel with the marginal wall on the two sides of the table and defining two runways at right angles to each other, a horizontal circular saw disposed in association with a third side of the table and disposed above the table at a height equal to the depth of cut of the gang saws, there being an opening in the table below the forward portion of the horizontal saw adapted to receive the cubes cut from the bottom face of the block, an endless conveyor having lugs and having a flight extending parallel to the wall of the third side of the table on the inner face of the wall, a spring projected guide extending approximately parallel with the last named side of the table and with the wall thereof defining a runway, that portion of the table upon which the block is discharged after passing the horizontal saw being elevated to a level with the saw and the table having an inclined face leading downward parallel to the fourth side of the table and to the entrance end of the first named runway, an endless conveyor having its upper flight traversing the elevated and inclined portions of the table, guiding means on the table adapted to be disposed in parallel relation to the wall on the fourth side of the table to define a runway leading to the first named conveyor, and upwardly projected guides disposed at the entrance end of each of the first three runways extending parallel thereto but at right angles to the direction of movement of the ice block on the previous runway, said guides being momentarily depressible by the passage of the block thereover.

3. An ice cubing machine, including a rectangular table having side walls, three ice-block guides having upstanding flanges disposed approximately parallel to but in spaced relation to said walls and defining a series of three runways parallel to the three walls of the table; two gangs of vertically disposed saws each gang being disposed in one of said runways and parallel to the outer wall thereof, the table having slots through which the saws project; a horizontal circular saw associated with a third side wall of the table and disposed above the table at a height equal to the depth of cut of the gang saws, there being a cube discharge opening below the forward portion of the horizontal saw; an endless conveyor associated with each of the first two runways and each conveyor having its upper flight flush with the surface of the table and having ice-block engaging lugs projecting above the table; a third endless conveyor disposed in a vertical plane with its inner flight extending parallel to the third wall of the table and in spaced relation to the corresponding guide, the forward portion of the inner flight of this last-named conveyor extending across the end of the preceding runway and the rear portion of the flight extending to the rear edge of the horizontal saw; that portion of the table upon which the ice-block is discharged after passing the horizontal saw and constituting a fourth runway being elevated to a level with the horizontal saw and said elevated portion having a downwardly inclined end extending parallel to the fourth side of the table and discharging onto the entrance end of the first-named runway; an endless conveyor having its upper flight traversing the elevated and downwardly inclined portions of the table; and guiding means associated with said elevated and downwardly inclined portions and adapted to extend parallel to the adjacent wall of the table.

4. An ice cubing machine, including a rectangular table having side walls, three ice-block guides having upstanding flanges disposed approximately parallel to but in spaced relation to said walls and defining a series of three runways parallel to the three walls of the table; two gangs of vertically disposed saws, each gang being disposed in one of said runways and parallel to the outer wall thereof, the table having slots through which the saws project; a horizontal circular saw associated with a third side wall of the table and disposed above the table at a height equal to the depth of cut of the gang saws, there being a cube discharge opening below the forward portion of the horizontal saw; an endless conveyor associated with each of the first two runways and each conveyor having its upper flight flush with the surface of the table and having ice-block engaging lugs projecting above the table; a third endless conveyor disposed in a vertical plane with its inner flight extending parallel to the third wall of the table and in spaced relation to the corresponding guide, the forward portion of the inner flight of this last-named conveyor extending across the end of the preceding runway and the rear portion of the flight extending to the rear edge of the horizontal saw; that portion of the table upon which the ice-block is discharged after passing the horizontal saw and constituting a fourth runway being elevated to a level with the horizontal saw and said elevated portion having a downwardly inclined end extending parallel to the fourth side of the table and discharging onto the entrance end of the first-named runway; an endless conveyor having its upper flight traversing the elevated and downwardly inclined portions of the table; guiding means associated with said elevated and downwardly inclined portions and adapted to extend parallel to the adjacent wall of the table; and three vertically disposed guides disposed in slots in the table and constructed and arranged to be depressed by an approaching block of ice, two of the guides being disposed just beyond the two saw gangs and parallel to the next succeeding runway and in line with the flanges of the first-named guides, the third guide being disposed at the end of the fourth runway and parallel to the direction of the first-named runway.

5. In an ice cube cutting machine having a series of runways disposed at right angles to each other and constituting a cyclic path over which the ice block to be cubed is successively carried; vertical guides located at the junction of one runway with another and extending across and at right angles to the preceding runway and parallel to and at the side of the succeeding runway; the runways having slots through which the guides are upwardly projected; and springs projecting said guides; the rear face of each guide being downwardly inclined to permit an approaching block of ice to ride over and depress the guide.

6. In an ice cubing machine, a table having two upstanding outer walls at right angles to each other and two ice-block guides disposed parallel with the walls and in spaced relation thereto and with the walls defining a runway extending in one direction and a second runway at right angles to the first-named runway; and a vertically depressible guide disposed at the junction between the two runways and across the first-named runway but parallel to the second-named runway and in line with the ice block guide in the second-named runway, and resilient means urging the depressible guide upward, the rear face of the depressible guide being downwardly and rearwardly inclined to permit a block of ice to ride over and depress the guide.

7. In an ice cutting machine, a table having marginal walls at right angles to each other; means on the table for cutting kerfs at right angles to each other in the lower end of a block of ice to define cubes; a horizontal saw raised above the table for cutting off the cubes so defined; the table havig a runway on a level with the saw and upon which the block of ice is discharged after leaving the horizontal saw, the raised portion having a downwardly inclined discharge end; block conveying means traveling longitudinally of the raised portion of the table, a gate-like guide pivoted at one side of said runway for swinging movement in a horizontal plane; a spring urging the guide to a position across the runway; and an outwardly bowed member mounted on the entrance face of said guide and against which a block of ice will abut to swing the guide to a position parallel to the wall of the runway.

CHARLES BUFFEHR.